United States Patent [19]

Bass et al.

[11] Patent Number: 6,132,618

[45] Date of Patent: *Oct. 17, 2000

[54] SYSTEM AND METHOD FOR WAKING A COMPUTER HAVING A PLURALITY OF POWER RESOURCES FROM A SYSTEM STATE USING A DATA STRUCTURE

[75] Inventors: Jonathan L. Bass, Audubon; Tanya Dade-Figueroa, Glenside, both of Pa.

[73] Assignee: PQ Corporation, Berwyn, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 09/061,825

[22] Filed: Apr. 16, 1998

[51] Int. Cl.$^7$ .................................................. B01D 61/00
[52] U.S. Cl. .......................... 210/652; 210/651; 210/641; 423/702
[58] Field of Search ..................................... 210/651, 652, 210/641; 423/702; 106/38.35

[56] References Cited

U.S. PATENT DOCUMENTS

| | | | |
|---|---|---|---|
| 3,857,924 | 12/1974 | Halasz et al. | 423/338 |
| 4,316,744 | 2/1982 | Bergha | 106/38.35 |
| 4,839,037 | 6/1989 | Bertelsen et al. . | |
| 4,857,290 | 8/1989 | Shimizu . | |
| 5,028,360 | 7/1991 | Ito et al. . | |
| 5,165,905 | 11/1992 | Sasaki et al. . | |
| 5,624,658 | 4/1997 | Fitoussi et al. | 423/702 |

FOREIGN PATENT DOCUMENTS

| | | |
|---|---|---|
| 60-042218 | 3/1985 | Japan . |
| 60-090811 | 5/1985 | Japan . |

OTHER PUBLICATIONS

Petersen, R. J., "Composite reverse osmosis and nanofiltration membranes," *Journal of Membrane Science*, vol. 83 (1993), pp. 81–150.

Hoebbel, D. et al., "Sodium Silicate Solutions—Structure, Properties and Problems," *Zeitschrift fur Chemie*, vol. 28, No. 2, pp. 41–51, 1988.

*Primary Examiner*—Ana Fortuna
*Attorney, Agent, or Firm*—Ratner & Prestia

[57] ABSTRACT

A method for purifying commercial alkali metal silicate solutions involves passing the alkali metal silicate solution through a nanofiltration device having a membrane with a molecular weight cutoff of between about 400 to about 3,000 daltons. Preferably, the molecular weight cutoff is between about 400 and about 1,000 daltons and, more preferably, between about 400 and about 800 daltons. In this way, a large portion of impurities in alkali metal silicate solutions, which tend to become associated with higher molecular weight silicates, can be removed. A pressure differential may be used to drive the solution across the device, from which a permeate is withdrawn as a purified alkali metal silicate solution. The retentate from the device is preferably recycled to the feed alkali metal silicate solution to form a mixture, and the mixture is introduced to the nanofiltration device. Two or more devices, of decreasing molecular weight cutoff, may be used in series to obtain a more concentrated form of a purified silicate solution. When two devices are used, the second device has a molecular weight cutoff sufficient to allow water molecules to pass but to retain most of the remaining molecules. In order to achieve this, a molecular weight cutoff of approximately 100 to 600 daltons and, preferably, from about 150 to about 400 daltons, is suitable.

18 Claims, 2 Drawing Sheets

SYSTEM AND METHOD FOR WAKING A COMPUTER HAVING A PLURALITY OF POWER RESOURCES FROM A SYSTEM STATE USING A DATA STRUCTURE

FIELD OF THE INVENTION

The present invention pertains to a method for purifying alkali metal silicate solutions and, more particularly, a method for isolating high purity, stable alkali metal silicate solutions from conventional commercial silicate solutions of lower purity. The present invention also pertains to the purified alkali metal silicate solution produced thereby.

BACKGROUND OF THE INVENTION

Alkali metal silicate solutions are mostly composed of water and a distribution of silicate anions of different molecular weights, whose charges are balanced by metal cations and protons. In addition, trace metallic and anionic impurities are present. These impurities originate from raw materials used to manufacture silicate solutions and from erosion of process equipment used in such manufacture. These impurities may be undesirable in applications in which silicate solutions are used. Such applications include the use of silicate solutions in the manufacture of siliceous catalysts, as chromatographic supports, and as cleaning solutions. The impurities may be found on the surface of siliceous supports, thereby undesirably changing the surface properties, such as reactivity and adsorption. In long term storage, the presence of impurities may lead to precipitation of siliceous solids which may remain as undesirable residues in demanding cleaning applications.

Accordingly, it is desirable to purify alkali metal silicate solutions to avoid the detrimental effects of the impurities. A number of methods are known to produce and purify alkali metal silicate solutions of commercial purity, which is a purity level which may cause some or all of these detrimental effects. For example, Table 1 shows some typical commercial alkali metal silicate solutions, with the compositions and impurities shown both on a wet basis (as sold as a concentrate) and on a 100% $SiO_2$ basis. As used herein, a "commercial alkali metal silicate solution" (or a "feed alkali metal silicate solution") shall mean an alkali silicate solution having an impurity level of at least 450 total ppm of the following impurities Al, Fe, Ca, Mg, and Ti (taken together), measured on a 100% $SiO_2$ basis. The total of these impurities is listed in Table 1 for each commercial silicate solution as "Sum ppm," and the total of these impurities for the first solution listed (i.e., KASIL® potassium silicate solution sold by PQ Corporation of Valley Forge, Pa.) is 913 ppm.

One common way of making an alkali metal silicate solution, particularly a sodium silicate solution, is a fusion process. In this process, mixtures of sand and sodium carbonate are fused in open hearth furnaces of regenerative or recuperative design fired with gas or oil. This process would require very high purity quartz sand and sodium carbonate to manufacture alkali metal silicate solutions substantially more pure than those listed in Table 1.

TABLE 1

Commercial Silicate Solutions

|  | PQ Corp. KASIL® 6 Potassium Silicate 2.1 wt. ratio | | Zaclon Potassium Silicate 1.8 wt. ratio | | PQ Corp. N® Sodium Silicate 3.22 wt. ratio | | PQ Corp. RU® Sodium Silicate 2.4 wt. ratio | | Occidental Petroleum 42D Sodium Silicate 3.25 wt. ratio | | Vinings #9 Sodium Silicate 3.11 wt. ratio | |
| --- | --- | --- | --- | --- | --- | --- | --- | --- | --- | --- | --- | --- |
| % $SiO_2$ | 26 | 100 | 26 | 100 | 28.7 | 100 | 33 | 100 | 30.1 | 100 | 28.7 | 100 |
| Al ppm | 91 | 405 | 198 | 762 | 136 | 473 | 227 | 688 | 190 | 631 | 84 | 212 |
| Fe ppm | 39 | 172 | 131 | 504 | 39 | 136 | 58 | 177 | 50 | 166 | 44 | 11 |
| Ca ppm | 38 | 168 | 20 | 77 | 11 | 38 | 27 | 82 | 25 | 83 | 18 | 45 |
| Mg ppm | 11 | 49 | 8 | 31 | 6 | 20 | 10 | 32 | 12 | 40 | 6 | 15 |
| Ti ppm | 27 | 119 | 40 | 154 | 39 | 138 | 52 | 158 | 44 | 146 | 34 | 86 |
| Sum ppm | 205 | 913 | 397 | 1527 | 231 | 805 | 375 | 1136 | 321 | 1066 | 186 | 469 |
| Cu ppb | n.a. | n.a. | n.a. | n.a. | n.a. | n.a. | n.a. | n.a. | n.a. | n.a. | 400 | 1400 |
| Ni ppb | n.a. | n.a. | n.a. | n.a. | n.a. | n.a. | n.a. | n.a. | n.a. | n.a. | 100 | 350 |
| Cr ppb | n.a. | n.a. | n.a. | n.a. | n.a. | n.a. | n.a. | n.a. | n.a. | n.a. | 300 | 1000 |
| Zn ppb | n.a. | n.a. | n.a. | n.a. | n.a. | n.a. | n.a. | n.a. | n.a. | n.a. | 1000 | 3500 | n.a. means not analyzed

According to U.S. Pat. No. 4,857,290, high purity silica can be produced from a silica sol by first preparing, from an alkali metal silicate solution, an acidic silica sol and using a cationic exchange resin to remove the impurities such as Ti, Fe, and Al. For example, a dilute silicate solution which is contacted with a relatively large amount of resin will remove sodium or potassium to the point where colloidal silica (sol) will form.

The use of ultrafiltration devices, which have membranes with molecular weight cutoffs generally higher than nanofiltration devices, have been mentioned. For example, R. K. Iler has mentioned the use of ultrafiltration to determine molecular weight distribution of a silicate solution, but does not disclose using such membranes to remove impurities from silicate solutions. In addition, U.S. Pat. No. 4,857,290 mentions the use of ultrafilitration as a procedure to purify an alkali silicate solution prior to the preparation of the acidic silica sol, but does not envision withdrawing the permeate of this procedure as product alkali metal silicate solution, without further processing.

SUMMARY OF THE INVENTION

The present invention provides a method for purifying commercial alkali metal silicate solutions by passing the alkali metal silicate solution through a nanofiltration device having a membrane with a molecular weight cutoff within a range of from about 400 to about 3,000. Preferably, the molecular weight cutoff is between about 400 and about 1,000 and, more preferably, between about 400 and about 800.

According to an embodiment of the present invention, the solution is passed through the nanofiltration device by applying a pressure differential to the nanofiltration device to drive the feed alkali metal silicate solution through the nanofiltration device. Two streams, a retentate stream and a permeate stream, exit from the device. The retentate has a higher concentration of impurities than the feed alkali metal silicate solution, and the permeate has a lower concentration of impurities than the feed alkali metal silicate solution. The permeate may be withdrawn as a purified alkali metal silicate solution.

According to another embodiment of the present invention, the retentate is recycled to a retentate tank and mixed with the feed alkali metal silicate solution to form a mixture, and the mixture is introduced to the nanofiltration device.

According to a preferred embodiment of the present invention, the present invention provides a method for both purifying and concentrating alkali metal silicate solutions. According to this embodiment, two or more nanofiltration devices are disposed in series, with decreasing molecular weight cutoffs. With this configuration, the permeate from the first nanofiltration device is passed through a second nanofiltration device having a molecular weight cutoff less than that of the first nanofiltration device. The second nanofiltration device has a molecular weight cutoff sufficient to allow water molecules to pass but to retain most of the remaining molecules. A molecular weight cutoff of approximately 100 to 600 (preferably from about 150 to about 400) achieves this function. The second retentate is withdrawn and collected as a concentrated and purified alkali metal silicate solution, according to this embodiment.

The present invention also provides a high purity, alkali metal silicate solution produced by the methods of the present invention. The solution is defined by a particular purity level, a particular $SiO_2$:alkali metal ratio range, and a molecular weight distribution of silicate anions.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

The present invention is directed to a method for purifying an alkali metal silicate solution. In general, the present invention is accomplished by passing a commercial alkali metal silicate solution through a nanofiltration device having a selected pore size. As mentioned above, the terms "commercial alkali metal silicate solution" or "feed alkali metal silicate solution" shall mean an alkali silicate solution having an impurity level of at least 450 total ppm of the following impurities Al, Fe, Ca, Mg, and Ti (taken together), measured on a 100% $SiO_2$ basis. Some typical concentrated forms of commercial alkali metal silicate solutions are shown in Table 1. By purifyng such commercial alkali metal silicate solutions, the present invention serves to reduce the impurity content by some appreciable level, preferably by reducing the total of the above five impurities by at least about 50%, more preferably at least about 70%, and most preferably at least about 90%.

It should be recognized that the terms "commercial alkali metal silicate solution" or "feed alkali metal silicate solution," as used herein, shall mean a diluted form of the concentrates shown in Table 1. Alkali metal silicate solutions are typically sold at concentrations near the solubility limit of the solids, with a concentration of dissolved solids as high as possible to minimize shipping costs but not so high as to cause desolubilization or gelation. If such concentrates are concentrated further, desolubilization or gelation would occur. During the purification process of the present invention, such further concentration naturally occurs in the retentate because water is passed as permeate. If any significant desolubilization or gelation is permitted to occur, the nanofiltration device used in the process would no longer operate properly.

Figure 1:
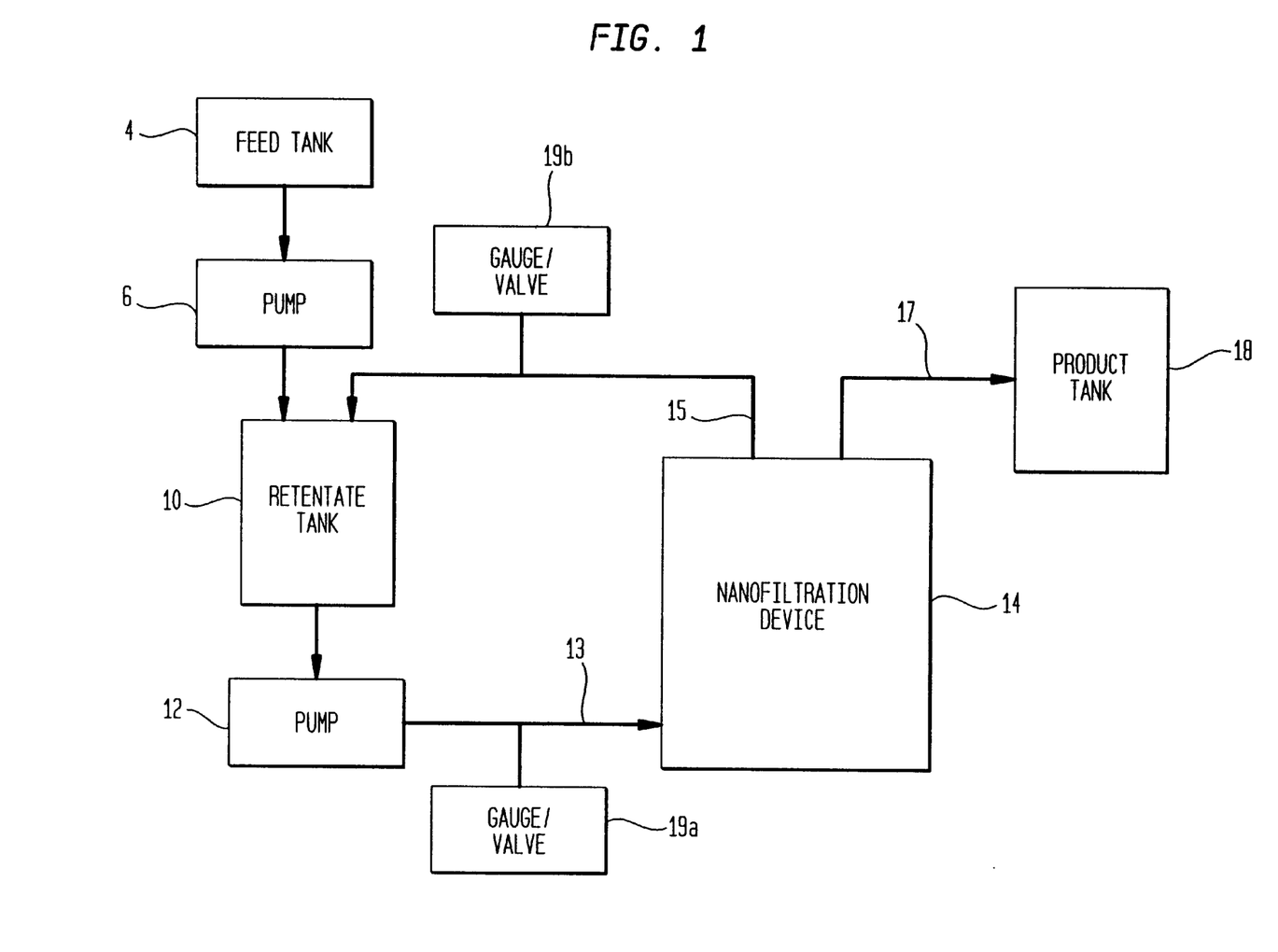
FIG. 1 is a schematic view of a first embodiment of the present invention.

The phrase "significant" desolubilization or gelation is intended to mean a level of desolubilization at or above which a significant portion (e.g., over one-quarter) of pure alkali metal silicate structures are precluded from passing through the nanofiltration device of the embodiment shown in FIG. 1 (or the first nanofiltration device shown in FIG. 2) due to the presence of the desolubilized solids or gel. It should be noted that, in some cases, a small amount of desolubilization or gelation can be advantageous, as discussed below. These cases are when a filter is used with a higher molecular weight cutoff (i.e., close to 3,000 daltons) and a thin gel layer causes the effective molecular weight cutoff formed by the interaction of the filter and the thin gel layer to be reduced to an extent sufficient to retain a significant portion of the impurities but to allow purified product to pass through the filter.

Accordingly, the concentrated form of the solution (such as those shown in Table 1) should be diluted to an extent such that no significant desolubilization or gelation will occur during purification according to the present invention. The dilution ratio can be easily determined empirically by observation. Although the precise dilution ratio will vary with the particular equipment used, the desired purification level, and the desired flow rate of product, the ratio generally varies between one part (by volume) water to two parts of concentrated alkali metal silicate solution to two parts water to one part concentrated solution.

It has been found that impurities in alkali metal silicate solutions generally exist in two forms, a first set of impurities in which the cation impurity substitutes for silicon in a silicate anion and a second set of impurities in which the cation impurity bridges between two adjacent silicate anions. Metallic impurities such as iron, aluminum, titanium, zirconium, and chromium (among others) tend to substitute for silicon atoms in the larger silicate anions. Alkaline earth cations, such as calcium, magnesium, and barium, tend to bridge between adjacent silicate anions. Other cations, such as copper, nickel, and zinc, also tend to bridge between adjacent silicate anions.

In either case, these impurities form structures larger than smaller silicate anions such as a silicate monomer, dimer, and small linear oligomers. The present invention uses nanofiltration membranes of different molecular weight cutoffs to retain selectively the larger anions which contain the impurities, allowing purified silicate solutions to pass through the pores. It has been found that a significant portion of the first set of impurities form structures having an average molecular weight of above 3,000, an even greater portion above 1,000, an even greater portion above 800, and substantially all above 400. (The units of all molecular weights provided herein is daltons.) At least some of the structures (i.e., agglomerates) formed from the second set of impurities have molecular weights over 3,000, with more of the structures having a molecular weight over 1,000, still more over 800, and substantially all over 400.

On the other hand, it has also been found that a significant portion of the structures of a pure alkali metal silicate solution have molecular weights generally between about 100 and 600 daltons, and, in some cases, still more between about 150 and 400. The molecular weight distribution of the silicate anions, however, is a function of the $SiO_2:Na_2O$ ratio of the particular silicate solution. In particular, as this ratio is increased, the relative amount of higher molecular weight silicate anions increases. Accordingly, when the $SiO_2:Na_2O$ ratio is particularly low, there may not be enough higher molecular weight structures formed to remove a high percentage of the impurities. In this event, a membrane having a molecular weight cutoff on the lower end of the scale (i.e., close to 400) should be used. In general, as the molecular weight cutoff is decreased, the yield, expressed as the percentage of product formed from the total solution being purified, also decreases. Nonetheless, the present invention serves some purification function for all commercial alkali metal silicate solutions as defined above, although the present invention shows a more dramatic purification effect at higher $SiO_2:Na_2O$ ratios of between 1.6:1 to 4.0:1, and more preferably between 2.4:1 and 4.0:1.

As used herein, the phrase "nanofiltration device" shall mean any device or system which is capable of separating structures in a liquid having a greater molecular weight than a selected cutoff from those having a molecular weight less than the selected cutoff. The term molecular weight cutoff is well-known in the filtration field and represents the molecular weight above which structures will be retained as retentate and below which structures will be passed as permeate. In the present invention, a molecular weight cutoff is utilized such that a desired level of purity is obtained. In general, a molecular weight cutoff of between about 400 and about 3,000 is suitable for most applications, preferably between about 400 and about 1,000, and more preferably between about 400 and about 800. Of course, the particular molecular weight cutoff selected depends on a number of factors, including the desired purity level, the desired yield, the particular nanofiltration device used, the desired flow rate, the initial impurity level of the commercial silicate solution, and the molecular weight distribution of the commercial silicate solution, among other factors.

The molecular weight cutoff of a nanofiltration device is typically provided with the device or can easily be determined empirically. A particular molecular weight cutoff is achieved by preparing a membrane (or filter) having a number of pores each having a selected diameter. Although the term "diameter" is used herein, this should not imply that all of the pores are circular in cross section. Indeed, many pores are not circular, but the term diameter is merely used as a way to approximate the distance across two edges of the pore. In general, the pore diameters correspond to various molecular weight cutoffs as follows: A pore diameter of 0.5 nm corresponds to a molecular weight cutoff (MWCO) of 150; a pore diameter of 2.0 nm corresponds to an MWCO of 1,000; a pore diameter of 3.0 nm corresponds to an MWCO of 3,000; and a pore diameter of 5.0 nm corresponds to an MWCO of 10,000.

A wide variety of nanofiltration devices are commercially available with pore sizes suitable for selectively removing the impurities found in alkali metal silicate solutions. Common uses of such devices include purification of water, recovery of proteins of a desired molecular size, recovery of synthetic pharmaceuticals of a desired molecular size, and recovery of inorganic colloids of a desired molecular size. There are several manufacturers/vendors of such nanofiltration devices, including Osmonics, Inc. of Minnetonka, Minn.; New Logic of Emeryville, Calif.; Millipore Corporation of Bedford, Mass.; and Hydranautics of Oceanside, Calif. Numerous other nanofiltration devices could be suitable for the present invention, such as many of those disclosed in Petersen, R. J., "Composite Reverse Osmosis and Nanofiltration Membranes," J. Membrane Sci. 83 (1993) 81–150.

A preferred filtration device is sold by Osmonics, Inc. as the OSMO® sepralator. This device includes: a cylindrical permeate tube having an end through which the permeate exits the nanofiltration device; a set of layers spirally wound around the permeate tube; and a housing (or cartridge) enclosing the set of layers. The layers are made up of: a permeate carrier layer for carrying the permeate radially inward to the permeate tube; a mesh spacer along which the feed alkali metal silicate solution flows; and first and second membrane layers of the membrane for separating the permeate carrier layer from the mesh spacer and for retaining the impurities.

As used herein, the phrase "nanofiltration device" shall include conventional devices known as nanofiltration devices, such as those listed above. The phrase "nanofiltration device" shall also include any other device which can be used to permit structures in a liquid having a molecular weight of less than the molecular weight cutoff ranges specified above to pass, while retaining structures in a liquid having a molecular weight greater than the molecular weight cutoff ranges specified above. One such system is a gel permeation system, which uses a packed column of resin beads. The beads are designed so that the structures of lower molecular weight are absorbed by the beads while the higher molecular weight structures simply flow past the beads and out the column. In a second step, the absorbed lower molecular weight structures are recovered by passing high purity water through the column. Gel permeation systems are well known and could be readily designed by one skilled in the art to suit the needs of the present invention.

Referring now to the drawing, wherein like reference numerals refer to like elements throughout, FIG. 1 shows a schematic view of an embodiment of the present invention. A feed tank 4 stores a commercial alkali metal silicate solution, for example a diluted form of one of the silicate solutions shown in Table 1. A pump 6 pressurizes the solution and conveys it to a retentate tank 10. A pump 12 draws the solution from retentate tank 10 and conveys the solution along line 13 to a nanofiltration device 14, where the feed is purified.

Two streams are withdrawn from nanofiltration device 14, a retentate in line 15 and a permeate in line 17. The retentate is that portion of the feed stream which was retained by the membrane of nanofiltration device 14 and therefore has a higher concentration of impurities than the feed alkali metal silicate solution. The permeate is that portion of the feed stream which passes through the membrane of nanofiltration device 14 and therefore has a lower concentration of impurities than the feed alkali metal silicate solution. The permeate is withdrawn in line 17 as a purified alkali metal silicate solution, and can be stored in a product tank 18.

Preferably, and as shown in FIG. 1, the retentate is recycled via line 15 back to retentate tank 10, where it is mixed with the feed alkali metal silicate solution fed from feed tank 4 by pump 6 to form a mixture. This mixture is subsequently or continuously introduced to nanofiltration device 14 in the same manner that the raw feed is introduced. In the event that the concentration of impurities in the retentate tank becomes too large because of the recycling, the system must be purged and filled with fresh commercial alkali metal silicate solution.

Pressure gauges/valves 19a and 19b are disposed in lines 13 and 15, respectively. The function of the valves is to cause a selected pressure differential across nanofiltration device 14. (The purpose of the pressure differential is described below.) The pressure gauges are simply to monitor pressure at the inlet and outlet of nanofiltration device 14 to ensure proper flow.

According to the present invention, the commercial alkali metal silicate solution is passed through the nanofiltration device. This can be effected by applying a pressure differential across the nanofiltration device to drive the commercial alkali metal silicate solution through the nanofiltration device. As shown in the drawing, positive pressure pump 12 may be used to apply pressure to the relatively impure side of the nanofiltration device. Alternatively, a vacuum pump (not shown) can be placed at the outlet of nanofiltration device 14. The level of pressure applied to a particular system is dictated by the desired purity level, the desired flow rate, the molecular weight cutoff of the membrane, and the concentration of the feed stream. More specifically, it is desirable to have at least some appreciable flow rate to be able to purify the most alkali metal silicate solution as possible. Accordingly, the pressure applied must be above some minimum level dictated by the practical concern of having a sufficient flow rate.

As a higher pressure is applied, the flow rate increases, but the percentage of impure structures passing through the membrane also increases to some extent. It is believed that as the pressure increases, some of the larger impurity structures are forced through the membrane. As the applied pressure is increased even further, it has been found that some point is reached at which the percentage of impure structures passing through the membrane no longer increases (and, in fact, actually decreases in some cases). It is believed that, at these higher pressure levels, a thin gel layer is formed over the membrane, and the gel layer acts as a filter for the higher molecular weight impurities. The maximum pressure for any particular system is the highest pressure which the nanofiltration device can withstand without mechanical failure.

Based on this information, one skilled in the art would be able to readily obtain the needed pressure to obtain an alkali metal silicate solution at a desired flow rate and a desired purity level for a particular system. For example, it has been found that pressure drops of between about 95 and 400 psi, applied by changing the velocity of retentate flow through a restricted valve 19b, have been suitable when using the nanofiltration devices used in the examples. It is believed that pressures ranging from the use of a vacuum to 1,000 psi could be utilized depending on the factors discussed above.

Figure 2:
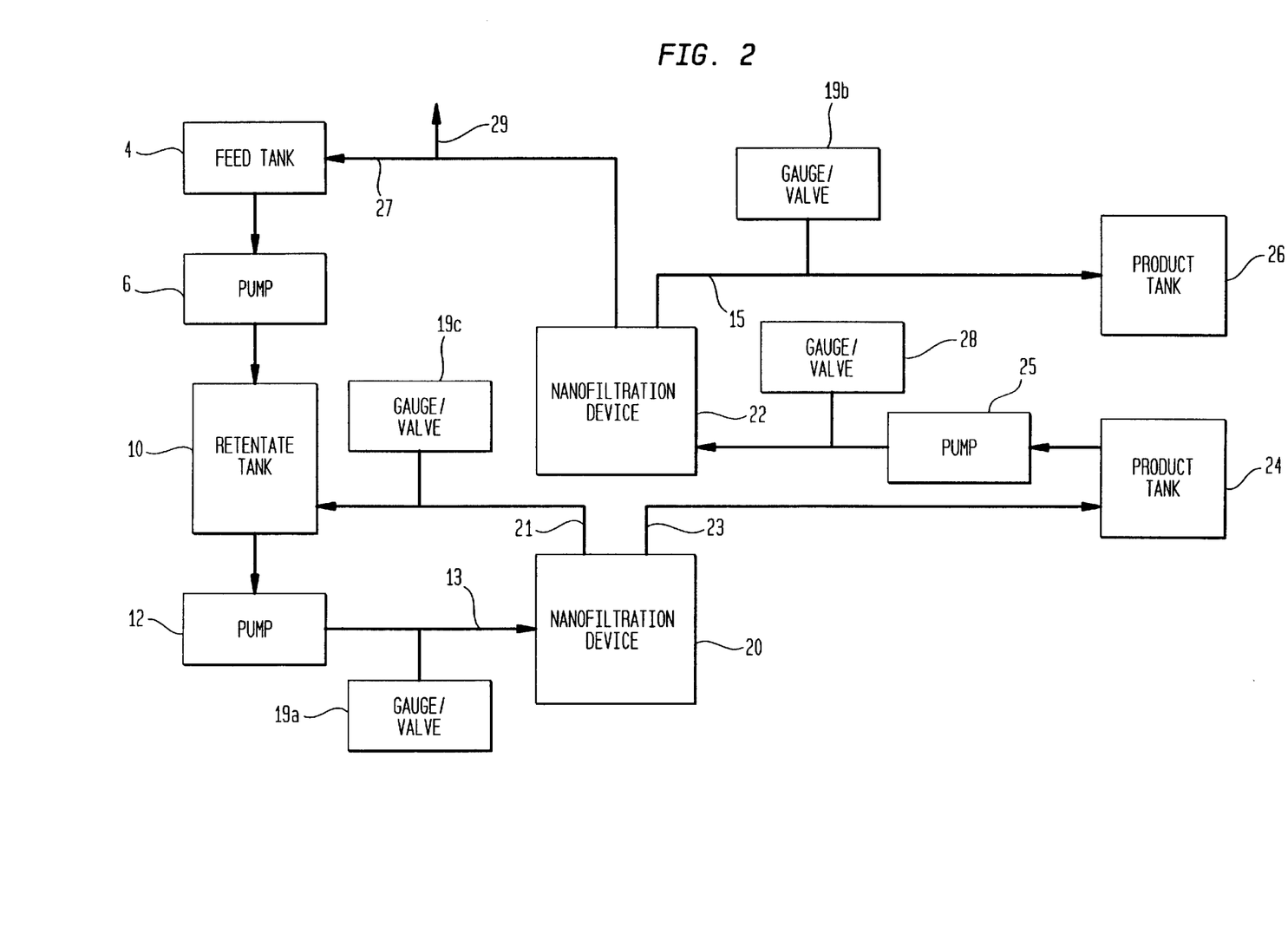
FIG. 2 is a schematic view of a second embodiment of the present invention.

FIG. 2 shows a schematic view of a second embodiment of the present invention. Feed tank 4, pump 6, retentate tank 10, pump 12, and pressure gauges/valves 19a, 19b, and 19c all operate in the same manner as in FIG. 1. In the embodiment shown in FIG. 2, a first nanofiltration device 20 is disposed in series with a second nanofiltration device 22. The molecular weight cutoff of the membrane of second nanofiltration device 22 is less than that of first nanofiltration device 20. The commercial alkali metal silicate solution is first delivered to first nanofiltration device 20, where a first retentate and a first permeate are withdrawn. The first retentate may be recycled to retentate tank 10 via line 21. First permeate is passed entirely to a first product tank 24 via line 23 then pumped to a higher pressure by pump 25 before being conveyed to second nanofiltration device 22. Gauge/valve 28 is used to measure the pressure.

First permeate conveyed to second nanofiltration device 22 is separated there into a second retentate and a second permeate. In this case, second permeate, which is mostly water, may be recycled to feed tank 4 via line 27 or may be discarded via line 29. Second retentate is withdrawn as a further purified and concentrated product and may be passed to a second product tank 26 via line 15. The molecular weight cutoff of second nanofiltration device 22 should be selected to be greater than the molecular weight of water molecules, but less than the molecular weight of the molecules associated with substantially pure alkali metal silicate solutions. Typically, this would be between 100 and 600 daltons, and preferably between about 150 and 400 daltons. As can be appreciated from this configuration, two different products with different purity levels (and different alkali to silicate ratios) can be obtained. Other alternatives include adding more than two nanofiltration devices in series and varying the molecular weight cutoffs of the respective nanofiltration devices. This embodiment, in which the purified solution is concentrated, is particularly advantageous because shipping costs are reduced.

The present invention is also directed to the high purity, alkali metal silicate solution produced by the methods of the present invention. As mentioned above, the method of the present invention removes the first five metals listed on Table 1, the total impurity level of which is identified as "sum ppm." The purified alkali metal silicate solution of the present invention preferably has an impurity level (as "sum ppm") of less than 300, more preferably less than 100, and most preferably less than 20. In addition, by removing some of the higher molecular weight silicate anions (while not removing the lower molecular weight alkali metal anions (e.g., $Na_2O$ or $K_2O$)), the silicate:alkali metal ratio is reduced to some extent. The extent to which this ratio (typically expressed as $SiO_2:Na_2O$ or $SiO_2:K_2O$) is reduced depends on the initial ratio before purification, the molecular weight cutoffs of the filtration devices used, and the composition of the solution before purification, among other factors. Finally, by removing some of the higher molecular weight molecules (and, in the case of the embodiment shown in FIG. 2, the lower molecular weight molecules), the molecular weight distribution of the purified solution is more compressed than before purification. The extent to which the molecular weight distribution is compressed depends primarily on the molecular weight cutoffs of the filtration devices used.

According to the present invention, silicate monomers, dimers, and small linear oligomers as well as the alkali metals such as sodium and potassium pass through a nanofiltration device while larger structures containing impurities (with either the silicon substituted or the cation impurity bridging between two silicate anions) are retained by the device. The present invention offers flexibility in achieving required silicate purity by varying membrane pore size and process conditions, compared to making large quantities of a fixed silicate purity, such as in a furnace. The present invention also avoids the erosion of process equipment, such as furnace refractory materials, which may add impurities to the silicate melt. The present invention also results in relatively stable, purified alkali metal silicate solutions, which can be stored for at least one year. In addition, the membranes of nanofiltration devices can be easily cleaned. Finally, the method of the present invention does not require the addition of other components, such as mineral acids utilized in at least one prior art process, which would add anionic impurities.

EXAMPLES

The following examples are included to more clearly demonstrate the overall nature of the invention. These examples are exemplary, not restrictive, of the invention.

In all of the examples, systems similar to the schematic views shown in FIGS. 1 or 2, depending on the Example, were used. Most of the system components are available from the same companies who make the nanofiltration devices, so that the systems are sold as a unit. The pump used was a conventional centrifugal pump. The only changes between examples were the particular commercial alkali metal silicate solution, the nanofiltration device, and the pressure applied. In all examples, inductively coupled plasma atomic emission spectroscopy was used to detect impurity levels in the products. The conditions for each example follow.

Example 1

A potassium silicate solution sold under the mark KASIL® 6 by PQ Corporation of Valley Forge, Pa., (the details of which are shown in Table 1) was diluted 1 part by volume KASIL® 6 solution with 1 part by volume high purity (>18 megohm resistivity) water. The solution was passed through a first nanofiltration device sold under the mark UF003 LA by Millipore Corporation, having a molecular weight cutoff (MWCO) of 1,000, at 200 psi. The permeate from the first nanofiltration device was then concentrated by being passed through a second nanofiltration device (with a MWCO of 150) sold under the mark Nanomax 95 by Millipore Corporation, at 400 psi. From the second nanofiltration device, the retentate was collected as the concentrated product, and its levels of impurities were measured.

Example 2

A sodium silicate solution sold under the mark N® by PQ Corporation (the details of which are shown in Table 1) was diluted 1 part by volume N® solution with 1 part by volume high purity (>18 megohm resistivity) water. The solution was passed through a UF003 LA nanofiltration device (with a MWCO of 1,000) at 200 psi. The permeate from this nanofiltration device was then concentrated by being pumped then passed through a Nanomax 95 nanofiltration device (with a MWCO of 150), at 400 psi. From the Nanomax 95 nanofiltration device, the retentate was kept as the concentrated product, and its levels of impurities were measured.

Example 3

N® sodium silicate was diluted 1 part by volume N® sodium silicate with 1 part by volume high purity (>18 megohm resistivity) water. The solution was passed through a nanofiltration device (with a MWCO of 750) sold under the mark BP02 by Osmonics, Inc., at 95 psi. The permeate was collected, and its levels of impurities were measured.

Example 4

A sodium silicate solution sold under the mark RU by PQ Corporation (the details of which are shown in Table 1, with a 2.4 wt. ratio) was diluted 1 part by volume RU sodium silicate with 1 part by volume high purity (>18 megohm resistivity) water. The solution was passed through a BP02 nanofiltration device (with a MWCO of 750) at 95 psi. The permeate was collected, and its levels of impurities were measured.

Example 4A

RU sodium silicate solution was diluted 1 part by volume RU sodium silicate with 1 part by volume high purity (>18 megohm resistivity) water. The solution was passed through a nanofiltration device (with a MWCO of 600) sold under the mark BQ01 by Osmonics, Inc., at 95 psi. The permeate was collected, and its levels of impurities were measured.

Example 5

N® sodium silicate was diluted 1 part by volume N with 1 part by volume high purity (>18 megohm resistivity) water. The solution was passed through a nanofiltration device (with a MWCO of 400) sold under the mark Nanomax 50 by Millipore Corporation, at 400 psi. The permeate from this nanofiltration device was then concentrated by being passed through a Nanomax 95 nanofiltration device (with a MWCO of 150), again at 400 psi. From the Nanomax 95 nanofiltration device, the retentate was kept as the concentrated product, and its levels of impurities were measured.

Example 6

N® sodium silicate was diluted 1 part by volume N with 1 part by volume high purity (>18 megohm resistivity) water. The solution was passed through a nanofiltration device (with a MWCO of 800) made by Hydranautics of Oceanside, Calif., identified by the mark NTR-7410, and available from New Logic of Emeryville, Calif., at 200 psi. The permeate was collected, and its levels of impurities were measured.

Example 7

N® sodium silicate was diluted 1 part by volume N with 1 part by volume high purity (>18 megohm resistivity) water. The solution was passed through a UF003 LB nanofiltration device (with a MWCO of 3,000) at 200 psi. The permeate from this nanofiltration device was then concentrated by being pumped then passed through a Nanomax 50 nanofiltration device (with a MWCO of 400), at 400 psi. From the Nanomax 50 nanofiltration device, the retentate was kept as the concentrated product, and its levels of impurities were measured.

Table 2 shows the results of the measurements for impurities for all seven Examples. As can be seen, all seven show at least some reduction in the level of impurities for the first five impurities listed. In fact, the total impurity content in the alkali metal silicate solutions of Examples 1–7 were reduced as follows: 93.2%, 92.0%, 71.3%, 51.5%, 76.3%, 98.1%, 61.9%, and 83.7%, respectively. Interestingly, the four Examples showing the highest percentage reduction (Examples 1, 2, 5, and 7) were the four whose solutions were passed through two nanofiltration devices. Even though the solutions of Examples 3, 4, and 6 were passed through only one nanofiltration device, each did show some appreciable reduction in impurities. The relatively lower reduction of Example 4 can be explained, at least in part, by the alkali metal silicate used (i.e., RU sodium silicate solution) which has a lower $SiO_2:Na_2O$ weight ratio, meaning that the distribution of silicate anions is different. More specifically, less high molecular weight silicate anions are present when an alkali metal silicate solution of a lower $SiO_2:Na_2O$ weight ratio is used. Example 4A shows that a lower MWCO membrane reduces more impurities for RU sodium silicate solution.

Although illustrated and described herein with reference to certain specific embodiments and examples, the present invention is nevertheless not intended to be limited to the details shown. Rather, the claims should be read to include various modifications within the scope and range of equivalents of the claims, without departing from the spirit of the invention.

through said nanofiltration device comprises applying a pressure differential across said nanofiltration device to drive said feed alkali metal silicate solution through said nanofiltration device.

6. The method in accordance with claim 1 further comprising:
   passing said permeate through a second nanofiltration device having a molecular weight cutoff less than the molecular weight cutoff of said first nanofiltration device to form a second permeate and a second retentate; and
   withdrawing said second retentate as a concentrated and purified alkali metal silicate solution.

7. The method in accordance with claim 6, wherein the molecular weight cutoff of said second nanofiltration device is within a range of from about 100 daltons to about 600 daltons.

8. The method in accordance with claim 7, wherein the molecular weight cutoff of said second nanofiltration device is within a range of from about 150 daltons to about 400 daltons.

TABLE 2

Impurities in Nanofiltered Silicates, 100% $SiO_2$ basis

| Example | 1 | 2 | 3 | 4 | 4A | 5 | 6 | 1 |
|---|---|---|---|---|---|---|---|---|
| Alkali type | Potassium | Sodium | Sodium | Sodium | Sodium | Sodium | Sodium | Sodium |
| Al ppm | 35.4 | 43.9 | 174 | 403 | 183 | 6 | 287 | 86 |
| Fe ppm | 1.9 | 2.8 | 15 | 52 | 26 | <3 | 43 | 17 |
| Ca ppm | 23.2 | 13.8 | 21 | 27 | 29 | <3 | 13 | 11 |
| Mg ppm | 0.6 | 1 | 0.4 | 0.6 | 0.3 | 0 | n.d. | n.d. |
| Ti ppm | 1.3 | 2.9 | 20 | 73 | 30 | <3 | 68 | 17 |
| Sum ppm | 62.5 | 64.3 | 231 | 555 | 269 | <15 | 307 | 131 |
| Cu ppb | 190 | 268 | 107 | 191 | 1608 | n.a. | n.a. | n.a |
| Ni ppb | 709 | n.a. | 322 | 1370 | 257 | n.a. | n.a. | n.a. |
| Cr ppb | 120 | 58 | 13 | 113 | 51 | n.a. | n.a. | n.a. |
| Zn ppb | 160 | 88 | 291 | 436 | 193 | n.a. | n.a. | n.a. | n.a. means not analyzed

What is claimed is:

1. A method for purifying an alkali metal silicate solution comprising the steps of:
   introducing a feed alkali metal silicate solution to a nanofiltration device having a membrane with a molecular weight cutoff within a range of from about 400 daltons to about 3,000 daltons;
   passing said feed alkali metal silicate solution through said nanofiltration device to form a retentate having a higher concentration of impurities than said feed alkali metal silicate solution and a permeate having a lower concentration of impurities than said feed alkali metal silicate solution; and
   withdrawing said permeate as a purified alkali metal silicate solution.

2. The method in accordance with claim 1, wherein said molecular weight cutoff is within the range of from about 400 daltons to about 1,000 daltons.

3. The method in accordance with claim 2, wherein said molecular weight cutoff is within the range of from about 400 daltons to about 800 daltons.

4. The method in accordance with claim 1 further comprising recycling said retentate by mixing said retentate with said feed alkali metal silicate solution to form a mixture and introducing said mixture to said nanofiltration device.

5. The method in accordance with claim 1, wherein the step of passing said feed alkali metal silicate solution 9. A method for purifying an alkali metal silicate solution comprising the steps of:
   introducing a feed alkali metal silicate solution to a nanofiltration device having a membrane with a plurality of pores of diameters sufficient to retain structures having molecular weights of at least a molecular weight cutoff within a range of from about 400 daltons to about 3,000 daltons, wherein said feed alkali metal silicate solution has a first set of impurities which substitute for silicon atoms in silicate anions having an average molecular weight of above 3,000 daltons and a second set of impurities which tend to bridge between silicate anions to make at least some structures having a molecular weight of above 3,000 daltons;
   applying a pressure differential to said nanofiltration device to drive said feed alkali metal silicate solution through said nanofiltration device to form a retentate having a higher concentration of said first and said second set of impurities than said feed alkali metal silicate solution and a permeate having a lower concentration of said first and said second set of impurities than said feed alkali metal silicate solution; and
   withdrawing said permeate as a purified alkali metal silicate solution.

10. The method in accordance with claim 9, wherein:
   said first set of impurities is selected from the group of at least one of iron, aluminum, titanium, zirconium and chromium; and said second set of impurities is selected from the group of at least one of calcium, magnesium, barium, copper, nickel, and zinc.

11. The method in accordance with claim 9, wherein the step of applying a pressure differential includes applying about 200 psi to about 400 psi.

12. A method for purifying a feed alkali metal silicate solution wherein the improvement comprises passing said feed alkali metal silicate solution through a nanofiltration device having a membrane with a molecular weight cutoff within a range of from about 400 to about 3,000.

13. The method in accordance with claim 12, wherein said molecular weight cutoff is within the range of from about 400 to about 1,000.

14. The method in accordance with claim 13, wherein said molecular weight cutoff is within the range of from about 400 to about 800.

15. The method in accordance with claim 12, wherein:

the step of passing said feed alkali metal silicate solution through a nanofiltration device forms a permeate; and said method further comprises withdrawing said permeate as a purified alkali metal silicate solution.

16. A method for purifying an alkali metal silicate solution comprising the steps of:

introducing a feed alkali metal silicate solution to a first nanofiltration device having a membrane with a first molecular weight cutoff within a range of from about 400 to about 3,000;

passing said feed alkali metal silicate solution through said nanofiltration device to form a first retentate having a higher concentration of impurities than said feed alkali metal silicate solution and a first permeate having a lower concentration of impurities than said feed alkali metal silicate solution;

passing said first permeate through a second nanofiltration device having a second membrane with a second molecular weight cutoff less than said first molecular weight cutoff to form a second permeate and a second retentate; and withdrawing said second retentate as a concentrated and purified alkali metal silicate solution.

17. The method in accordance with claim 16, wherein said first molecular weight cutoff is within the range of from about 400 to about 1,000 and said second molecular weight cutoff is in the range of from about 100 to about 600.

18. The method in accordance with claim 17, wherein said first molecular weight cutoff is within the range of from about 400 to about 800 and said second molecular weight cutoff is in the range of from about 150 to about 400.

* * * * *

UNITED STATES PATENT AND TRADE MARK OFFICE
CERTIFICATE OF CORRECTION

PATENT NO. : 6,132,618
DATED : October 17, 2000
INVENTOR(S) : Jonathan L. Bass et al.

It is certified that error appears in the above-identified patent and that said Letters Patent is hereby corrected as shown below:

On the cover of the patent, at "[54]", delete the title "SYSTEM AND METHOD FOR WAKING A COMPUTER . . . USING A DATA STRUCTURE", and insert --METHOD FOR PURIFYING ALKALI METAL SILICATE SOLUTIONS--.

Signed and Sealed this

Twenty-second Day of May, 2001

Attest:

NICHOLAS P. GODICI

Attesting Officer    Acting Director of the United States Patent and Trademark Office